Nov. 14, 1967  H. R. FEHLING ETAL  3,352,621
BALL POINT WRITING INSTRUMENT
Filed Feb. 16, 1965  10 Sheets-Sheet 1
FIG. 1
FIG. 2
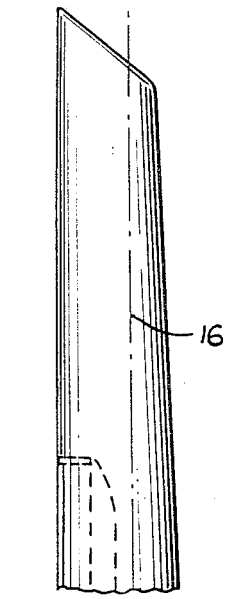
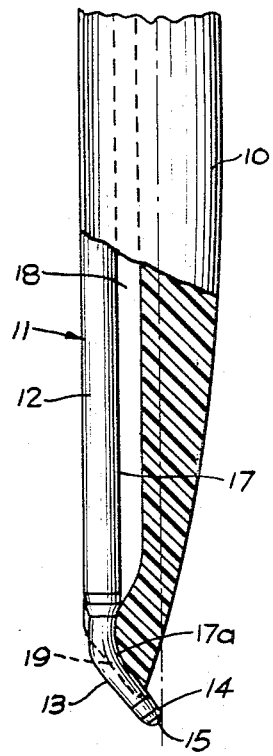
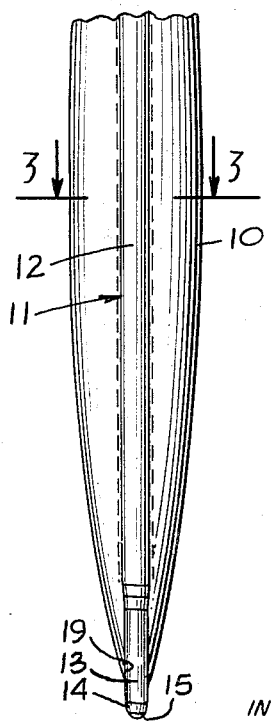
INVENTORS.
HANS REINHARD FEHLING,
BY ALFRED DENNIS STREET
Brumbaugh, Free, Graves & Donohue
their ATTORNEYS

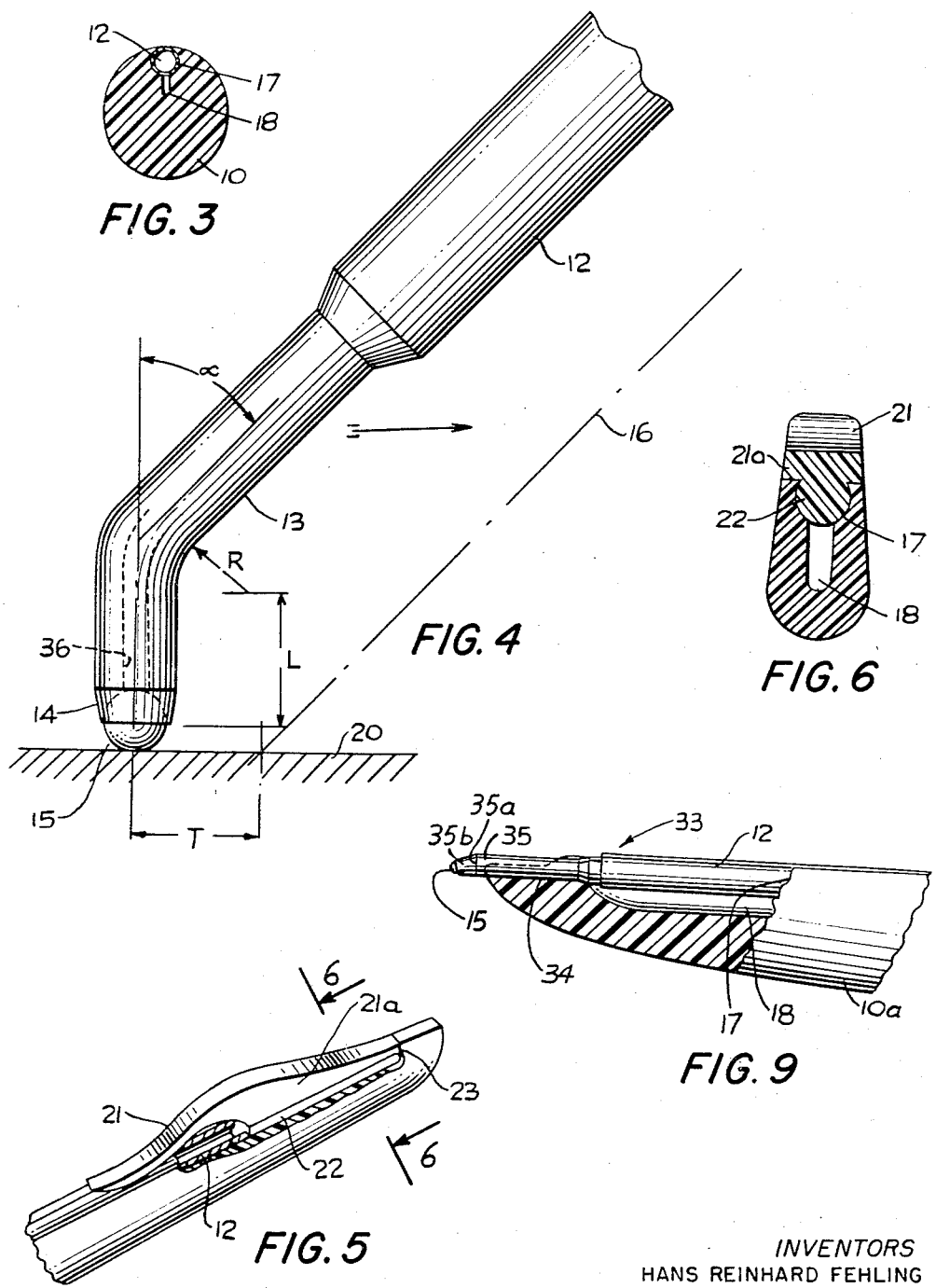

Nov. 14, 1967   H. R. FEHLING ET AL   3,352,621
BALL POINT WRITING INSTRUMENT
Filed Feb. 16, 1965   10 Sheets-Sheet 3

INVENTORS
HANS REINHARD FEHLING &
ALFRED DENNIS STREET
BY
Brumbaugh, Free, Graves & Donohue
their ATTORNEYS

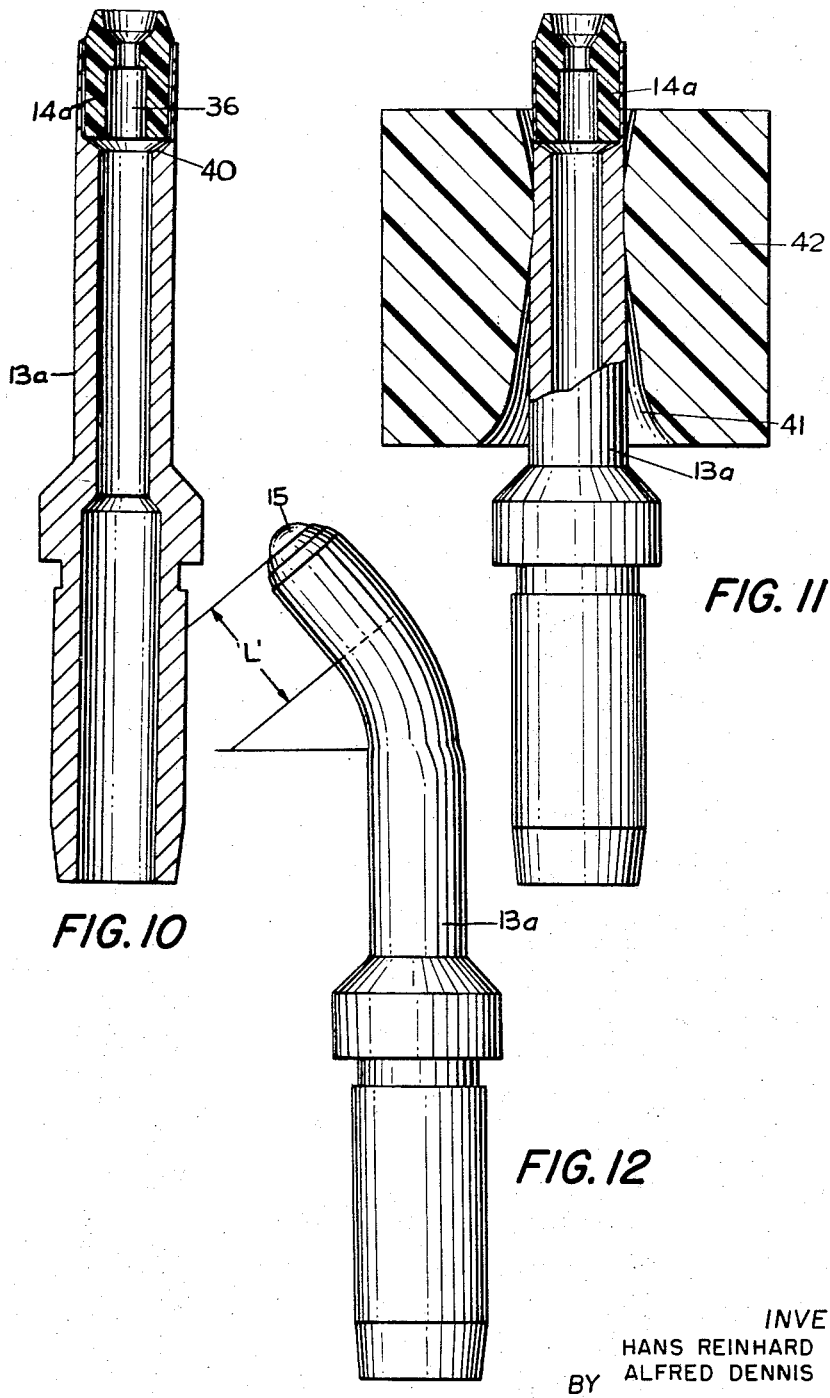

Nov. 14, 1967 H. R. FEHLING ET AL 3,352,621
BALL POINT WRITING INSTRUMENT
Filed Feb. 16, 1965 10 Sheets-Sheet 5
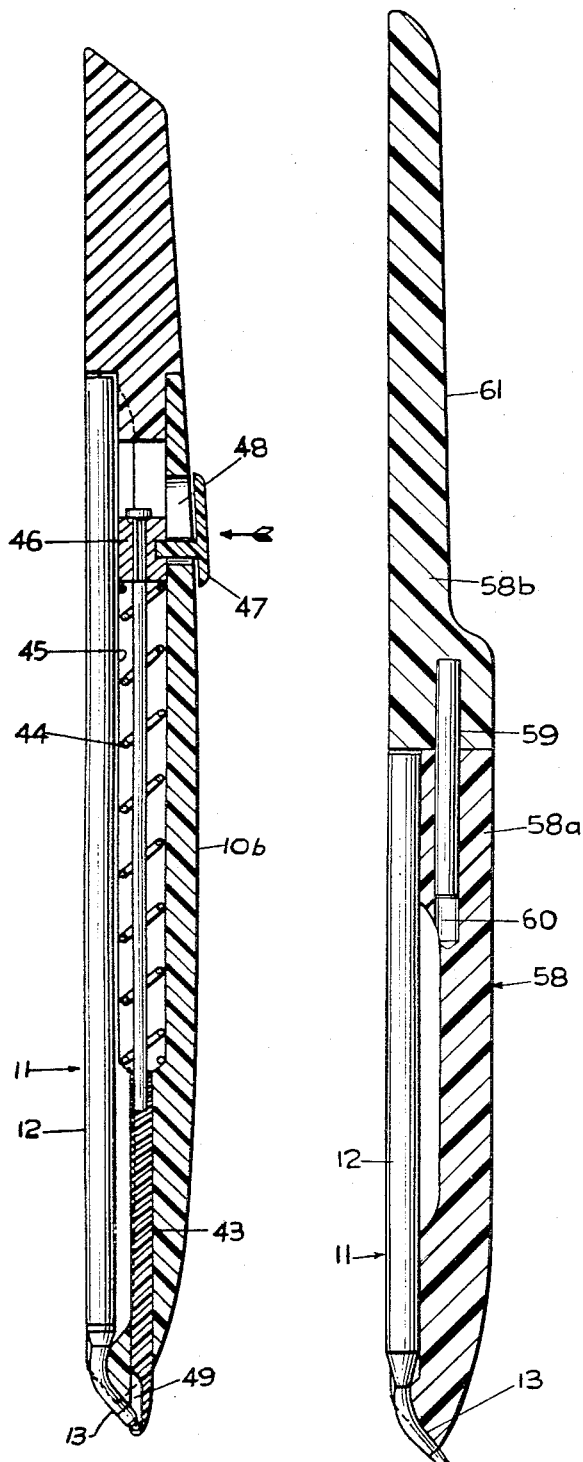
FIG. 13
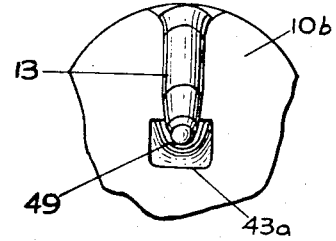
FIG. 14
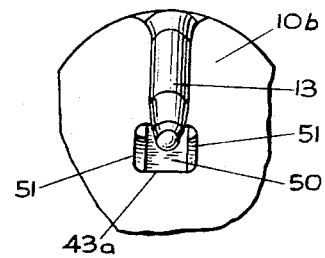
FIG. 15
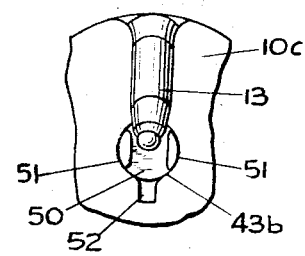
FIG. 16
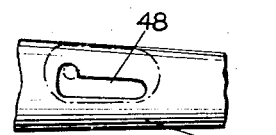
FIG. 17
FIG. 20
INVENTORS
HANS REINHARD FEHLING &
BY ALFRED DENNIS STREET
Brumbaugh, Free, Graves & Donohue
their ATTORNEYS

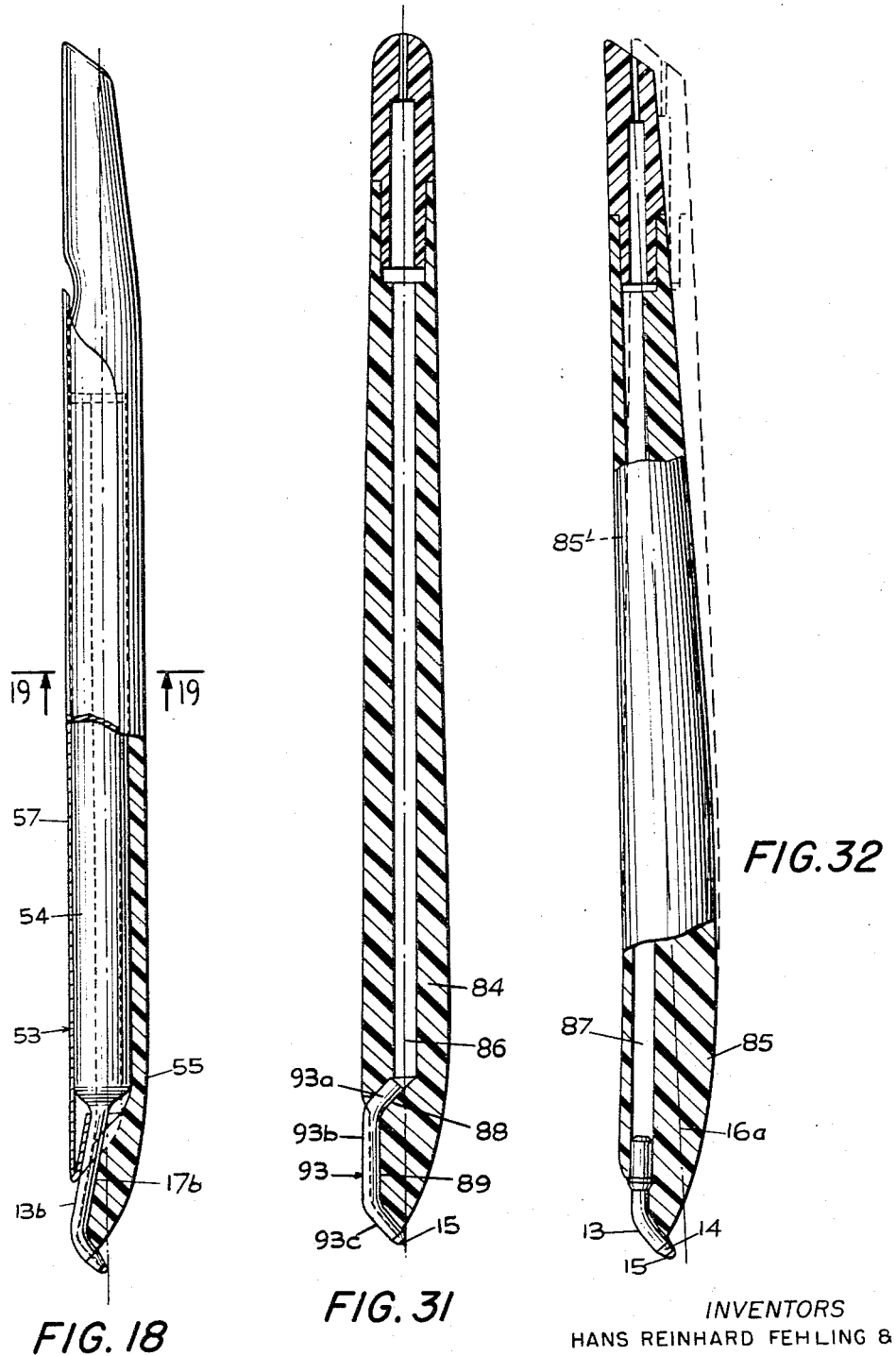

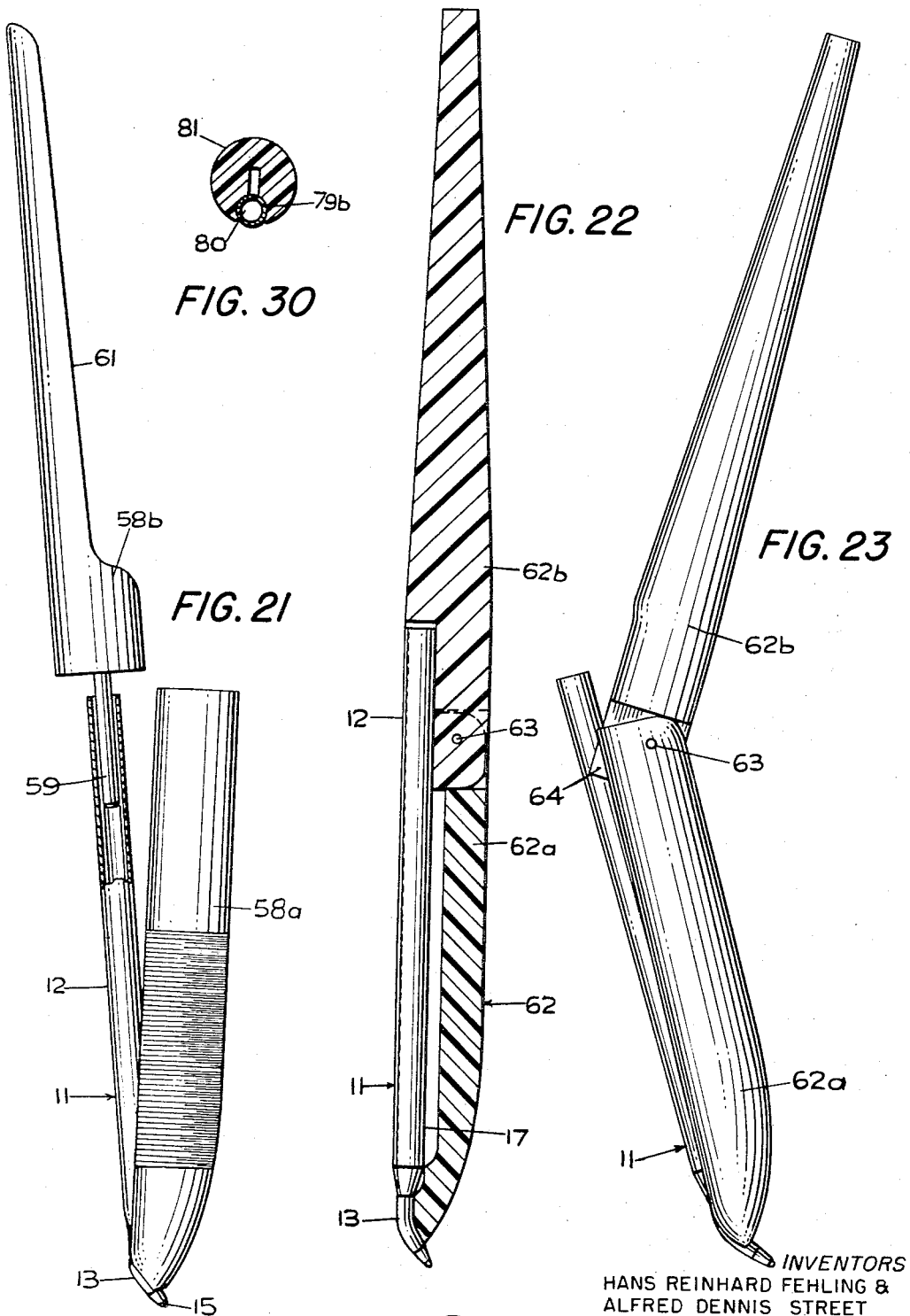

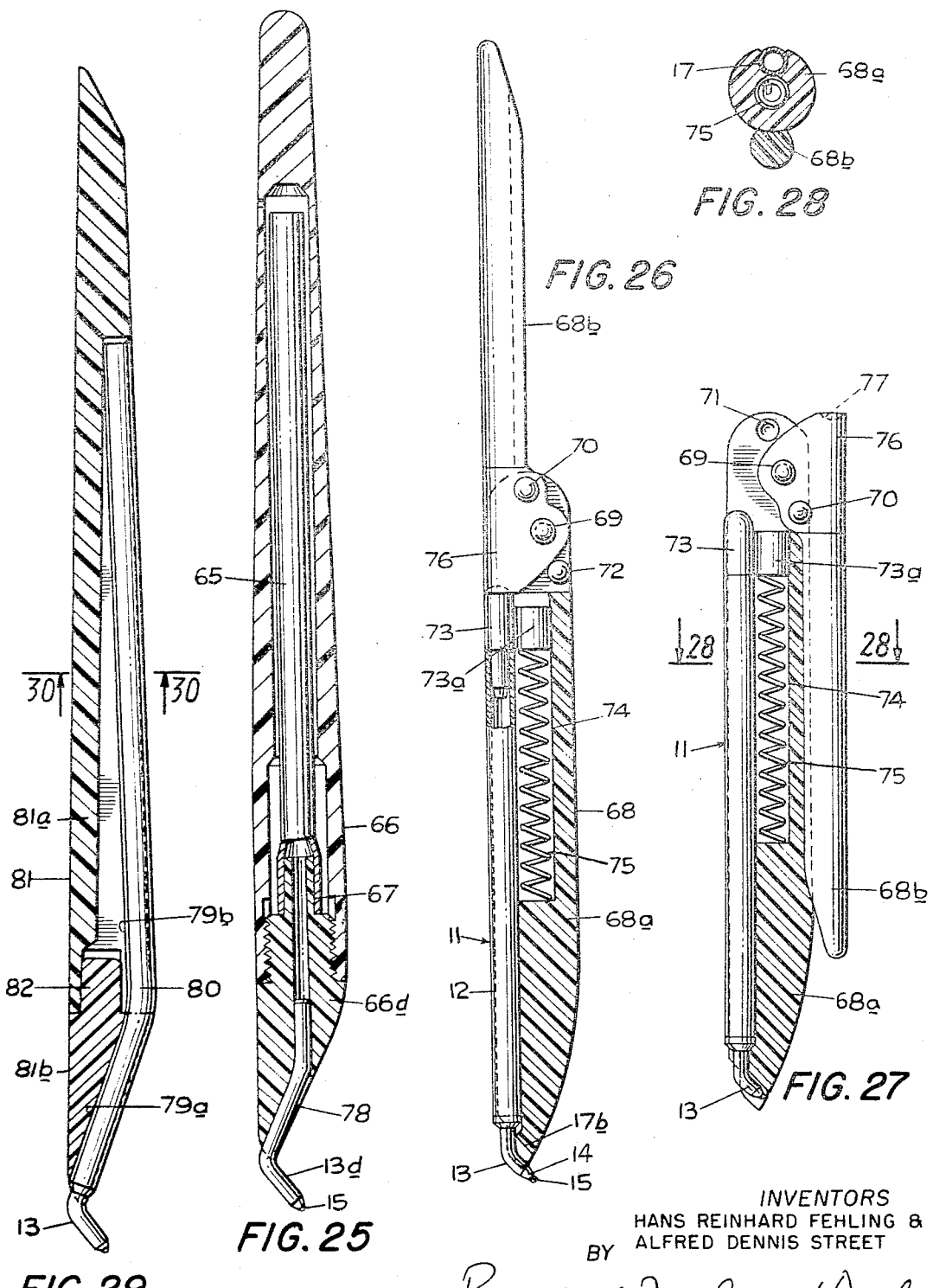

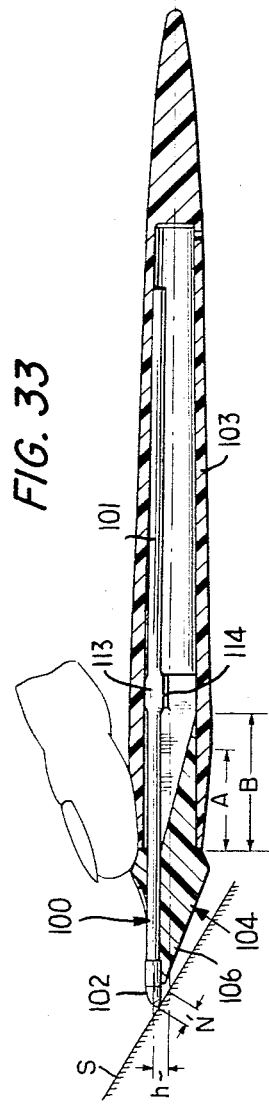
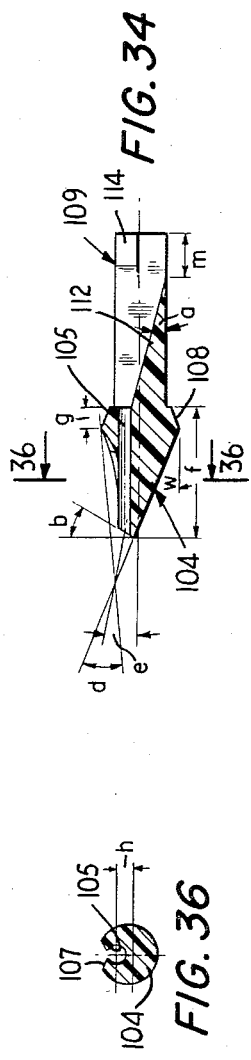
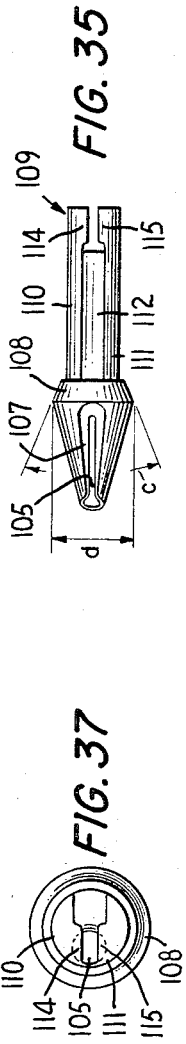
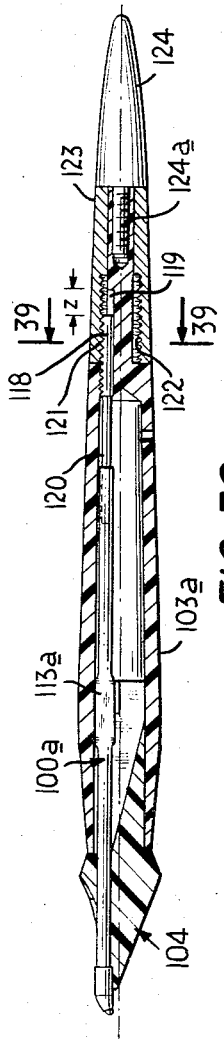
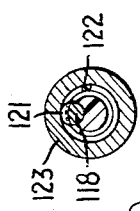

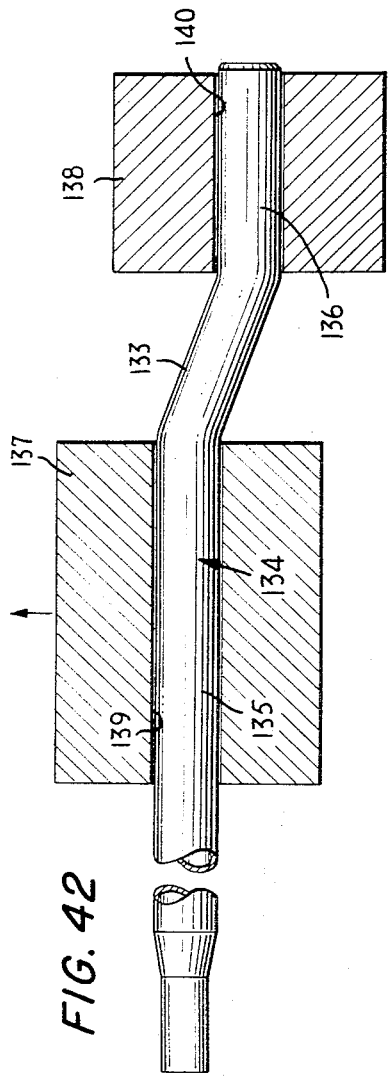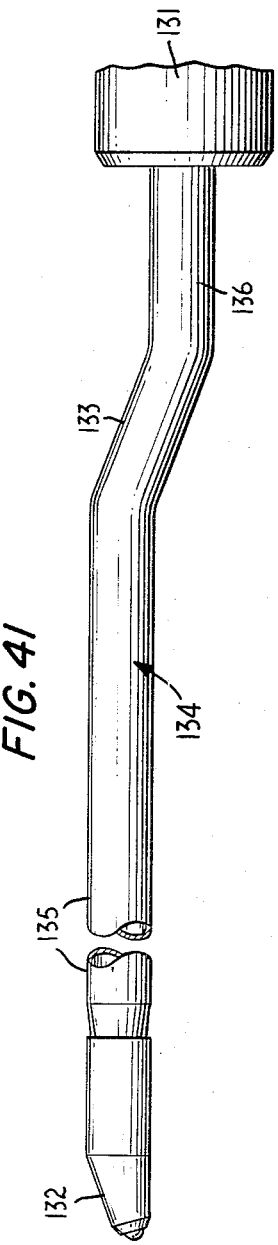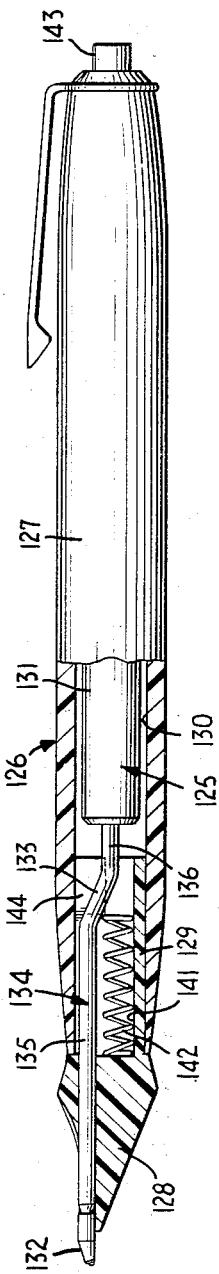

United States Patent Office 3,352,621
Patented Nov. 14, 1967

3,352,621
BALL POINT WRITING INSTRUMENT
Hans Reinhard Fehling, Zug, Switzerland, and Alfred
Dennis Street, Pinner, England, assignors to I.R.C.
Limited, London, England, a company of Great
Britain
Filed Feb. 16, 1965, Ser. No. 433,015
Claims priority, application Germany, Mar. 20, 1964,
J 25,501
8 Claims. (Cl. 401—109)

This is a continuation-in-part of our copending United States application Ser. No. 87,821, filed Feb. 8, 1961, now abandoned, for "Ball Point Writing Instrument."

This invention relates to ball point writing instruments and, more particularly, to a new and improved ball point writing instrument especially designed for greater ease and convenience in writing.

Many proposals have already been made for ball point writing instruments in which the shaft of the instrument could be held at a relatively small angle with respect to the writing surface without causing the rim of the ball socket to scrape the surface during writing. For various reasons discussed in greater detail hereinafter, however, the previous proposals have been partially or entirely unsuccessful.

Accordingly, it is an object of the present invention to provide a new and improved ball point writing instrument which overcomes the above-mentioned disadvantages of the prior art.

Another object of the invention is to provide a new and improved ball point writing instrument permitting an increased angle between the axis of the ball socket and the writing surfaces in use while, at the same time, providing a positive trailing condition.

A further object of the invention is to provide a writing instrument having improved visibility to facilitate control of the writing trace.

These and other objects of the invention are attained by providing a writing instrument having a writing extremity including a tubular member which is received in a groove along the upper surface of the mounting therefor and is bent at a location closely adjacent to the ball socket so as to incline the axis of the socket with respect to the instrument axis. Preferably, the location of the bend in the tubular member is no greater than about ⅛ inch to the rear of the writing ball and, in every instance, the distance from the bend to the writing ball should be less than about half the diameter of the writing instrument.

In addition, the writing instrument of the invention also includes a mounting for the writing extremity having a profile which, as presented to the writer during use, is formed by lines converging toward an apex at the location of the writing ball. Also, provide the required visibility of the writing extremity, the mounting includes a groove in its upper surface extending rearwardly from the forwardmost extremity of the holder in which the writing extremity is received so as to be exposed to the view of the writer. Moreover, to facilitate trace control, the holder of the writing instrument includes a shaft which has a surface symmetric about the axis of the holder in the area gripped by the fingers of the writer in use.

In certain embodiments of the invention wherein the writing unit or refill is separable from the holder and may be separately manufactured, a keying arrangement is provided to assure proper orientation of the bent writing extremity when the writing unit is assembled with the holder to form a writing instrument and, in some cases, this function is performed by the bent portion of the writing instrument and a mating groove portion of the mounting; whereas, in other cases, the configuration of the writing unit rearwardly of the writing extremity is arranged to provide a key.

Further objects and advantages of the invention will be apparent from the following description taken in conjunction with the accompanying drawings, in which:

FIG. 1 is a side view, partly in section, of a typical instrument made according to the invention;

FIG. 2 is a top view of the instrument shown in FIG. 1;

FIG. 3 is a sectional view taken on the line 3—3 in FIG. 2;

FIG. 4 is an enlarged view showing the relation of a bent tubular member with respect to a writing surface wherein a trail is provided;

FIG. 5 is a perspective view of the rear end of an instrument illustrating the attachment of a pocket clip;

FIG. 6 is an enlarged sectional view taken on the line 6—6 in FIG. 5;

FIG. 9 illustrates another writing instrument according to the invention provided with a writing extremity having a tubuar member which is bent in a different way;

Figure 24:
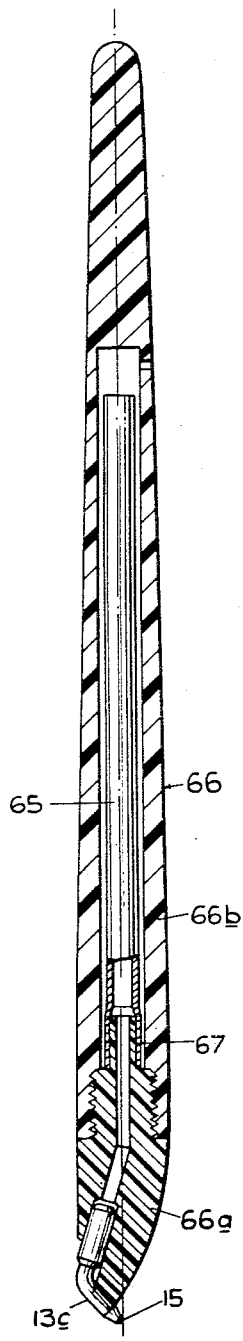
Figure 19:
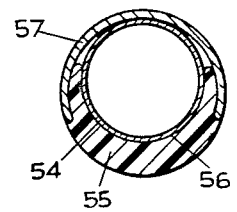

FIGS. 10, 11, and 12 illustrate the mounting of a socket insert into a writing extremity having a bent tubular member;

FIG. 13 is a longitudinal section through an instrument having a rectractable device for shielding the ball;

FIGS. 14, 15, and 16 are end views on an enlarged scale showing alternative forms of the shielding device of FIG. 13;

FIG. 17 is a fragmentary view illustrating a portion of the instrument shown in FIG. 13;

FIG. 18 shows a further instrument having a larger-than-capillary size reservoir;

FIG. 19 is a cross-sectional view of the instrument shown in FIG. 18, taken on the line 19—19;

FIG. 20 is a view in longitudinal section through a further instrument;

FIG. 21 is an elevation view of the instrument shown in FIG. 20, partly in section, showing the method of extracting the writing unit or refill;

FIG. 22 is a longitudinal section through a further instrument;

FIG. 23 is an elevation view illustrating the operation of the instrument shown in FIG. 22;

FIGS. 24 and 25 are longitudinal sections through still further instruments;

FIGS. 26 and 27 show a folding writing instrument according to the invention;

FIG. 28 is a cross-sectional view of the instrument shown in FIG. 27 in the folded condition taken on the line 28—28 of FIG. 27;

FIG. 29 shows a further instrument;

FIG. 30 is a cross-sectional view taken on the line 30—30 of FIG. 29;

FIGS. 31 and 32 show expendable or "throw away" instruments;

FIG. 33 is a view in longitudinal section through a further ball point writing instrument constructed according to the invention;

FIG. 34 is a view in longitudinal section through the head portion of the ball point writing instrument shown in FIG. 33;

FIG. 35 is a plan view of the head portion shown in FIG. 34;

FIG. 36 is a sectional view taken on the line 36—36 of FIG. 34;

FIG. 37 is an end view of the head portion looking from the right in FIG. 35;

FIG. 38 is a view in longitudinal section through an instrument similar to that of FIGS. 33–37 showing a modified form of construction of a ball point writing instrument having a retractable cartridge;

FIG. 39 is a sectional view taken on the line 39—39 of FIG. 38 and looking in the direction of the arrows;

FIG. 40 is a side view, partly broken away, showing another writing instrument according to the invention;

FIG. 41 is an enlarged fragmentary view of the writing unit in the instrument of FIG. 40; and FIG. 42 illustrates one method of forming a key in the writing units of FIGS. 40 and 41.

As used in the specification and claims herein, the term "writing extremity" or "writing tip" of a ball point writing instrument means that portion comprising the writing ball, the socket in which the writing ball is mounted, including an internal ink feed duct coaxial with the ball-receiving socket which supplies ink to the ball through the rear wall of the socket, and a "tubular member" which extends rearwardly from the socket and has an internal passageway to convey ink to the socket and the writing ball through the ink feed duct. At its other end, the tubular member is connected either directly or through an intervening ink conveying member called an "adapter" to a reservoir of writing ink, also called an "ink cartridge," but, in every instance, the writing extremity is a member which is originally separate from the reservoir or ink cartridge for reasons which will be apparent from the description herein. In those instances in which the ink cartridge and the writing extremity are separable from the holder therefor, the term "writing unit" or "refill" means the combined writing extremity and ink cartridge.

In addition, as used in the specification and claims in connection with a writing extremity, the term "mounting" means the portion of a holder in which the writing extremity is received, while the term "shaft" designates that portion of the holder which extends rearwardly of the mounting and is held in the hand of the writer. Moreover, the term "holder" encompasses a combined mounting and shaft, and the term "writing instrument" or "pen" means the combination of a holder and an ink reservoir and writing extremity, whether or not the latter are separable from the holder in the manner of a refill. Also, the term "positive trail" designates the condition in which the writing ball follows the intersection of the axis of the instrument with the writing surface on a downward stroke, and the term "negative trail" designates the condition in which the writing ball leads the intersection of the instrument axis with the writing surface on a downward stroke.

In conventional ball point writing instruments, the tubular member of the writing extremity and the axis of the ball-receiving socket therein are disposed on the axis of the writing instrument and within an internal bore in the mounting for the writing extremity. Consequently, conventional ball point writing instruments cannot provide a positive trail condition, which has been found to be desirable from the standpoint of trace control. Moreover, by reason of the enclosure of the writing extremity within the mounting, conventional ball point writing instruments provide poor visibility of the writing extremity while in operation, whereas good visibility of the writing extremity to the writer has been found to be essential to good control of the writing trace during writing. In addition, it is most convenient to hold a writing instrument at an angle of about 40 to 50 degrees to the writing surface. At this angle, however, because of the coaxial structure of the ball socket with the instrument, only one side of the ball emerging from the socket of a conventional ball point writing instrument is in touch with the writing surface, and the rim of the socket itself may scrape the paper. Consequently, conventional ball point pens must be held at relatively large angles with respect to the writing surface in order to function satisfactorily, which makes such pens less desirable to many persons than other types of writing instruments which can be held at a flatter angle. Furthermore, even though a conventional ball point pen may write satisfactorily when held at a large enough angle to the writing surface, optimum performance is obtained only when the axis of the ball-receiving socket in the writing extremity is approximately perpendicular to the writing surface.

Heretofore, in an attempt to overcome the above difficulties, many proposals have been made for ball point writing instruments which could be held at a smaller angle with respect to the writing surface. However, all the proponals made so far have been unsuccessful for at least one reason common to them, i.e., that they applied the wrong rules for functional design. It has been found by the applicants that in order to be acceptable as an instrument of daily use, its structural arrangement has to conform to certain rules which are dictated by the mechanical and physiological conditions governing the writing process itself. Writing, once learned, largely ceases to be a conscious act, and becomes an automatic mechanical process controlled by fixed memory patterns stored in the subconscious mind of the writer. For this reason, no conscious mental effort is required to reproduce one's own handwriting. On the other hand, it has been found that the subconscious mind is highly selective with regard to the structure of a writing instrument, which it will accept as "agreeing" or reject as "interfering" with the mental process governing the rapid and complex movements producing the writing trace. A further difficulty lies in the fact that most of the "agreeing" or "interfering" structural features of this kind cannot be determined by conscious analysis or be found independently of the others, but can only be found by a purely empirical process of trial and error of a complete instrument embodying many structural characteristics, in which the absence of irritation or inconvenience is the only clue that the correct combination of structural features has been found.

It was found, for example, that, whereas any degree of negative trail is highly irritating in use, a positive trail condition is highly desirable but very difficult to achieve in a practical pen. Poor visibility of the writing extremity, when the pen is held in the writing position, is another common irritant, but good visibility is especially difficult to obtain if the writing extremity is held at a steep angle. It was further found that the ease with which the writing instrument can be controlled, particularly in rapid writing, greatly depends on the shape and contour of the mounting for the writing extremity and that acceptability was quite independent of aesthetic appeal. Even the best functional shape of the shaft itself was found to be quite contrary to many current ideas.

Thus, prior proposals like the arrangements described in the Heyberger United States Patent No. 2,449,939 or the Gordon United States Patent No. 3,079,895 provide a highly undesirable negative trail condition. On the other hand, the positive trail condition of an instrument according to the Faltin United States Patent No. 2,592,406 is only achieved by a structure which is practically impossible to manufacture and offends against well-established rules of ball socket design. Previous proposals like the Segal French Patent No. 1,032,122 and the Gibbs United States Patent No. 2,518,770 have mountings with insufficient visibility and also have been very difficult to fabricate. Moreover, the holders for many previously proposed pens with inclined writing extremity have been shaped with blunt and/or angular forward ends (as in the Segal French patent and the Heyberger U.S. patent) which have been found detrimental to an easy visual control of the writing movement and, therefore, unacceptable in use. The holders have often been formed with an asymmetrical surface in the region gripped by the fingers (so-called "finger grips") which, contrary to hitherto accepted ideas on instrument design, do not reduce effort and strain but produce irritation and fatigue in prolonged use.

In the typical embodiment of the invention shown in FIGS. 1–3, the writing instrument comprises a holder 10 carrying a writing unit or refill 11 consisting of a straight capillary ink cartridge or reservoir 12 vented at its rear end, and a writing extremity or writing tip including a bent tubular member 13 connected to the forward end of the reservoir and a ball housing or socket 14 at the forward end of the tubular member having a writing ball 15 mounted therein. By providing a writing extremity including a bent tubular member in this manner, the objects of visibility and inclination of the socket axis are fully accomplished without imparting any undesirable negative trail, as is done in those instances wherein the ink cartridge or reservoir is bent and, in fact, the arrangement of the invention allows for the provision of considerable positive trail. Also, the necessity for a complex machined adapter structure interposed between the ball socket and the ink reservoir is avoided and, at the same time, the ink feed duct may be coaxial with the ball socket, as is essential to the manufacture of a satisfactory writing extremity. The reservoir and the ball housing are both of the conventional type, the latter being arranged with symmetric walls and ball seats and including a feed duct coaxial with the socket axis leading from the tubular member 13 to the rear of the writing ball 15. In this embodiment, the reservoir 12 fits into a groove 17 formed in the upper surface of the holder 10 so that the axis of the reservoir is spaced from but substantially parallel to the axis 16 of the writing instrument. The groove 17 is preferably of the re-entrant type, as shown in FIG. 3, so as to retain the reservoir 12, and it may be arranged that the sides of the groove grip the reservoir resiliently for which purpose flexibility may be imparted to the material around the groove by the provision of a narrow longitudinal slot 18 at the base of the latter. The reservoir may either be snapped laterally into the groove or may be pushed lengthwise into it. The holder 10 may be molded in one piece, as shown, or it may be made from right and left halves cemented together with a joint face between them coinciding with a central vertical plane.

The nose of the holder is tapered in plan and side elevation, as shown, so that the mounting for the writing extremity has a generally converging exterior surface. In side elevation, its upper margin 19 lies in the diametral plane of the forward part of the member 13 so that the parts 17a of the groove has a depth equal to half the diameter of member 13. The nose comes to a point, as shown, which is slightly spaced from the longitudinal axis of the instrument. This converging contour of the writing extremity mounting providing a profile having lines converging toward the location of the writing ball has been found to facilitate control of the writing trace. In addition, the portion of the shaft which is gripped in the hand of the user should have a surface which is symmetric about the instrument axis, as represented, for example, by the circular cross-section shown in the drawings or, if desired, by a cross-section of polygonal shape.

It will be appreciated that not only is the tubular member 13 of slender form so that it does not obstruct the view of the writing point but the forward part of the said member and the bend in it are exposed to view in the grooves 17a. The reservoir 12 is also exposed to view in the groove 17. Thus, if the reservoir 12 is made of transparent or translucent tubing, the ink supply is visible. Furthermore, it will be apparent not only that a writing instrument arranged in the manner shown in FIGS. 1–3 can be held at a lower angle to the writing surface, which is the normal writing position for many people, but also that the instrument provides optimum performance in this position because the axis of the ball-retaining socket is substantially perpendicular to the writing surface. Most important is the fact that, by providing a bent tubular member 13 in the writing extremity, the desired inclination of the socket axis is obtained without causing the writing ball to be disposed below the axis of the instrument, which would produce an undesirable "negative trail" condition. This is in contrast to the result obtained in prior arrangements wherein the ink cartridge or reservoir is bent in order to obtain the desired ball socket axis inclination.

The relation between the position of the writing extremity and the writing surface with an instrument of this type is best seen in FIG. 4 which is an enlarged view of the writing extremity shown in FIGS. 1–3 and the axis 16 of the instrument so as to illustrate the amount of positive trail provided by the arrangement. As shown in FIG. 4, when an instrument of the type shown in FIGS. 1–3 is held in the normal writing position, the axis of the ball socket and the forward end of the member 13 (with the feed duct, indicated at 36, contained therein) is normal to the writing surface 20, thereby assuring optimum performance of the writing extremity. In this example, there is a small trail, indicated by the dimension T, the direction of the down stroke being indicated by the arrow in the drawing. In the illustrated arrangement, the angle $\alpha$ between the front part of the member 13 and a line parallel to the axis 16 of the instrument is between 30 degrees and 50 degrees, preferably 40–45 degrees, and this represents the orientation at which writing instruments are normally held by most users. This angle is, of course, complementary to the angle taken with respect to the writing surface. Assuming that the ball is 1 millimeter in diameter, the member 13 may be 0.060 inch in diameter. In such case, the inside radius R of the bend should not be less than 0.125 inch and the dimension L should be about 0.125 inch or less in order to avoid negative trail with a holder of normal dimensions, but more gradual curvatures are also possible and, in some cases, even preferable, and these would permit a slightly greater distance between the center of the writing ball and the bend.

If desired, the instrument may be equipped with a pocket clip 21, as shown in FIGS. 5 and 6, wherein the root portions 21a of the clip may have a key 22 fitting in the rear part of the groove 17 and trapped between the rear end of the reservoir 12 and a surface 23 at the end of said groove.

Figure 7:
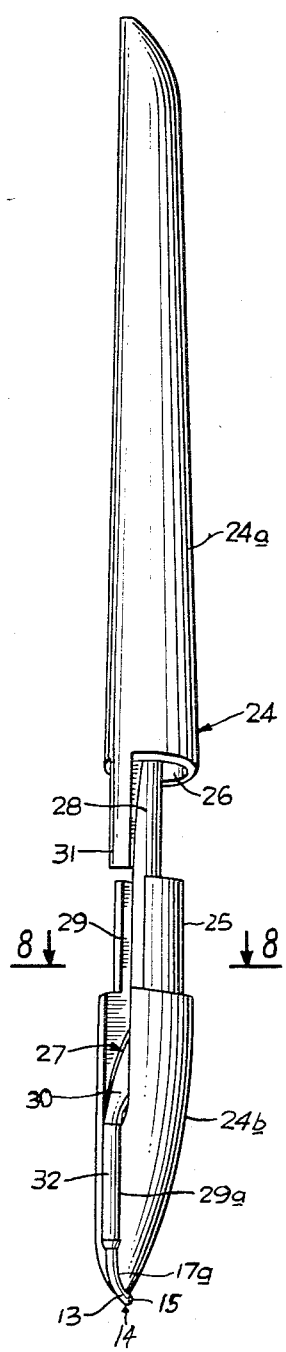
FIG. 7 is a perspective view illustrating a modified construction of instrument.
Figure 8:
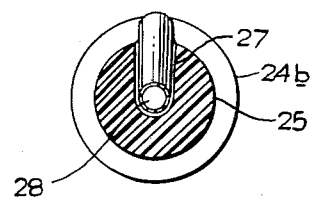
FIG. 8 is a section taken on the line 8—8 in FIG. 7.

In the embodiment of the invention shown in FIGS. 7 and 8, the holder or casing 24 consists of rear or upper and front or lower portions 24a and 24b, respectively, which are releasably connected by a male part 25 on the part 24b removably fitting into the hollow interior 26 of the part 24a. A removable writing unit 27 has a tubular reservoir 28, the major part of which is straight and is received in the hollow interior 26 and in a central groove 29 in the part 24b. In the main, this reservoir lies substantially at the axis of the instrument but it is curved to bring its front end 30 towards the upper surface of part 24b where it lies in a groove 29a which extends along the outer surface of the holder and communicates with the groove 29. The writing extremity 13, which is identical to that shown in FIGS. 1–3, lies in a groove 17a which communicates with the groove 29 and is inclined to receive the bent tubular member 13 so as to hold the writing ball slightly above the instrument axis, the forward end of the instrument providing a mounting for the writing extremity and being shaped in the same manner as that of FIGS. 1–3.

The writing unit is held in position in the instrument by means of a tongue 31 on the part 24a which fits into the groove 29 and overlies the bend 30. The bend 30 may be permanently set or may be a temporary flexure of a flexible reservoir tube made, for example, of polyethylene. If the reservoir tube is flexible, rigidity may be imparted to its forward end by shrouding it in a metal tube 32. The groove 29a is preferably of the re-entrant form adopted for the groove 17 in FIG. 3 so as to retain the tube 32 and it may be arranged so that the sides of the groove grip the tube resiliently, for which purpose flexibility may be imparted to the material around the groove by the provision of a narrow longitudinal slot at the base of the groove.

Instead of the tubular member 13 being bent with an inside radius R in the manner shown in FIG. 4, to dispose the ball 15 at or near the longitudinal axis 16, it may be bent by a forming operation of the type described in the copending application of Hans R. Fehling et al., Ser. No. 284,175, filed May 29, 1963, for "Tilted Nib for Ball Point Writing Instrument" now Patent 3,281,933. As described in that application, the tubular member of a writing extremity may be bent so as to tilt the socket axis by forcing a straight writing extremity through a die with a force applied eccentrically to the axis of the member. The result is a writing extremity which is bent along a plane extending transversely to the tubular member. This is illustrated in FIG. 9 wherein the writing unit 33 includes a writing extremity consisting of a tubular member 35 which is bent in a plane 35a to provide a tilted ball socket 35b. The writing extremity is accommodated in a groove 34 formed in the upper surface of the forward end of a holder 10a to provide a mounting in which the writing extremity is fully visible to the writer. As shown, the forward part of this groove 34 has a depth equal to half the diameter of the tubular member 35 and the rear part of the groove has a re-entrant form. If desired, however, the groove 34 may be of the re-entrant type along its entire length provided it is left sufficiently open to assure good visibility of the writing extremity to the user. The shaft portion of the holder 10a, to the rear of the writing extremity mounting, has a groove and slot 18 to receive the ink cartridge 12 of the writing unit in the same manner as in the embodiment of FIGS. 1–3. It will be readily apparent that the arrangement of FIG. 9 not only provides the advantages of the inclined ball socket axis and good visibility of the writing extremity to the user while avoiding an undesirable negative trail condition, but is also eliminates the necessity for inclining the groove 34 of the mounting for the writing extremity and permits a shorter spacing between the center of the ball 15 and the bend in the tubular member.

In certain instances, it is desirable to make the ball socket of a special material such as nylon, for example, which is not capable of being bent in the manner required of the tubular member 13 of FIGS. 1–3 and the tubular member 34 of FIG. 9. In these instances, a separate socket may be made and mounted in the tubular member. FIGS. 10–12 illustrate the attachment of a separately constructed ball housing 14a to a tubular member 13a by which it is placed in communication with a reservoir such, for example, as the reservoir 12 of the removable writing unit or refill 11 shown in FIGS. 1, 2, and 4. The method of attachment is particularly applicable in the case of a writing extremity molded from a synthetic resin or plastic such, for example, as filled nylon, as described in the copending patent application of H. R. Fehling and E. H. Harvey, Ser. No. 58,759, filed Sept. 27, 1960, now Patent No. 3,166,618, and assigned to the same assignee as the present application. Due to the physical properties of both filled and unfilled nylon, the conception of molding the ball housing 14a and the tubular member 13a as an integral whole, and thereafter bending it to suit the requirements of an instrument according to the present invention, leads to many difficulties. In order to avoid these difficulties, the ball housing 14a is constructed as an insert incorporating the ball socket and the end part of a feed duct 36 leading thereto. The insert is fitted loosely into a cavity 40 in the forward end of member 13a and its permanently fixed therein, preferably by either of two methods. The first of these methods is illustrated in FIG. 11. The assembly is pushed through a hole 41 in a wire drawing die 42, the size of which hole 41 is such as to constrict the thin wall of the cavity 40 around the insert 14, thereby firmly fixing the inserted writing extremity in position. A reduction in diameter of 0.002 inch in the cavity wall is adequate.

In the second method, the insert 14a is secured by a suitable adhesive, such as an epoxy resin. Conveniently, this adhesive is applied to the outer periphery of the insert before the latter is slipped into the cavity 40. After hardening, the adhesive affords an adequate union between parts 13a and 14a with a complete seal against ink leakage.

After the insert has thus been fixed in position, the subsequent conventional operations of inserting the ball, peining the lip of the housing around it, and bending the member 13a to the required angle, are carried out. It will be appreciated that the length of the nylon insert and the axial depth of the cavity 40 must be such that the insert does not encroach into the region of the bend, i.e., its length is not greater than the dimension L' in FIG. 12, which, as described previously, should be no more than about 0.125 inch to avoid negative trail. The member 13a may be a length of plain tube counter-bored at one end with the cavity 40.

Turning now to the embodiment of FIGS. 13–17, the general construction of the instrument therein shown is substantially the same as that shown in FIG. 1, the capillary tube reservoir 12 of the writing unit 11 being applied in a re-entrant groove 17 along the top of the shaft portion of a holder 10b. In this instrument, however, the shaft of the holder 10b is provided with a plunger 43 urged towards a retracted position by a compression spring 44 housed in a bore 45 of the shaft and pressing against an enlarged head 46 on the plunger. The plunger can be moved to a projected position by means of a thumb piece 47 operating in a keyhole slot 48 in the shaft and connected to the enlarged head 46, as shown in FIG. 13. It will be appreciated that the keyhole slot permits the plunger to be secured in the projected position.

In the projected position, the forward end of the plunger acts as a shield or mask for the ball. For this purpose, the forward end of the plunger may be provided with a ball receiving trough 49, as shown in FIG. 14, or it may have a transverse slot 50 between two side cheeks 51, as shown in FIGS. 15 and 16. In order to prevent the plunger from rotating about its axis in the shaft 10b, its forward part may be square or rectangular, as shown in FIGS. 14 and 15, to slide in a square or rectangular hole 43a in the shaft, or it may be of circular cross-section, as shown at 43b in FIG. 16, and have a key 52 sliding in a keyway in a corresponding shaft 10c.

In the case of a writing unit or refill having a reservoir the bore of which is above capillary size (i.e., the external diameter of which reservoir will, in general, be greater than 0.250 inch), it is not practicable to rely on the grip of the sides of a re-entrant groove to retain the unit because, were the degrees of re-entrant fit such as to permit easy insertion and removal of the large reservoir, too much of the reservoir would be exposed to view. FIGS. 18 and 19 illustrate a construction which is applicable in such circumstances. In this embodiment, the holder 55 of the instrument is "hull-like" in elevation and has a re-entrant groove 56 to receive the reservoir 54 with a groove 17b at the forward end, similar to that of FIG. 1, for receiving a bent tubular member 13b. The exterior of the shaft 55 is relieved to retain a metal cover 57 which covers and retains the reservoir 54. This cover 57 can either be slid lengthwise onto the shaft or snapped laterally into position.

By enclosing the ink cartridge or reservoir within the holder, therefore, rather than locating it in a groove extending along the outer surface of the holder, the inherent restriction on the capacity of the reservoir is eliminated and substantially larger ink supplies may be provided. At the same time, however, the embodiment of FIGS. 18 and 19 combines the essential features of the inclined ball socket axis, visibility of the writing extremity to the user and avoidance of negative trail by utilizing the bent tubular member 13b in the writing extremity. It will be readily apparent, moreover, that the added advantage of an increased ink supply may also be obtained with the arrangement previously described in connection with FIGS. 7 and 8 for the same reason, i.e., the reservoir is disposed internally within the holder rather than in a groove along the outer surface.

In the writing instrument shown in FIGS. 20 and 21, the writing unit 11 is identical to that shown in FIG. 1, having a capillary tube reservoir 12, and a writing extremity including bent tubular member 13 at the forward end. However, the shaft portion 58 of the instrument holder consists of front and rear parts 58a and 58b, respectively, which are connected by a spigot pin 59 attached to the part 58b and rotatably and slidably received, with a close fit, in an axial hole 60 in the part 58a. The rear part 58b is cut away with a flat 61 and may be rotated about the axis of the spigot 59 to an attitude in which the flat surface is conveniently disposed for contact with the hand of the writer, while the front part 58a receives the writing unit 11 in a re-entrant groove. The flat surface provides an increased area of contact with the hand. In order to replace the writing unit 11, the two parts 58a and 58b are separated and the spigot 59 is inserted into the rear end of the reservoir 12, as shown in FIG. 21, and urged upwardly to remove the unit 11 from the re-entrant groove in the front part 58a.

FIGS. 22 and 23 illustrate a further embodiment arranged for easy removal of the writing unit 11 in an instrument similar to that shown in FIG. 1. In this instrument, the holder shaft 62 consists of front and rear parts 62a and 62b hinged together by a hinge pin 63 at a location forward of the rear end of the reservoir 12. The re-entrant groove 17 for holding the writing unit 11 extends along the forward part 62a and part way along the rear part 62b and the writing unit, cooperating with a forward tongue 64 on the part 62b, normally locks the two parts 62a and 62b in alignment. However, when the two parts are moved relatively about their hinge pin 63, as shown in FIG. 23, the tongue 64 levers the rear end of reservoir 12 out of the re-entrant groove 17 so that it is then a simple matter to remove the writing unit completely.

In the construction shown in FIG. 24, a tubular reservoir 65 is substantially coaxially disposed within a holder 66. In order to achieve the required bend in an exposed tubular member 13c so as to provide a socket having its axis at the proper angle to that of the instrument and to place the writing ball 15 at or above the axis of the instrument, the forward part 66a of the holder serves as an adapter (screwed into a rear part 66b) to which the reservoir tube 65 is permanently connected by a spigot 67 and into which the tubular member 13c is fixed.

A modification of this construction is shown in FIG. 25 in which it will be seen that the rear end of a bent tubular member 13d is plugged into an axial hole in a forward part 66d and for a part of its length is received in a groove 78 in the underside of the front end of the part 66d. In this embodiment, the bent tubular member 13d is produced from plain tubing bored out at its forward end to provide the socket for the writing ball 15. As is apparent from the drawing, the groove 78 extends upwardly to intersect the upper surface of the mounting for the writing extremity so that a portion of the writing extremity lies in a groove which extends rearwardly from the forwardmost extremity of the holder along its upper surface.

In FIGS. 26–28, the shaft 68 of the instrument is adapted to fold like a jackknife. It consists of a front part 68a and rear part 68b pivoted together by a hinge pin 69. The reservoir 12 of a writing unit 11 is housed in a re-entrant groove 17 along the top of the part 68a. The rear part 68b may be held in alignment with the part 68a by means of oppositely directed pips 70 on one part engaging oppositely directed depressions or sockets 71 on the other, or it may be held in the folded position by engagement of the pips 70 with a further pair of sockets 72 on said other part. Thus, 180 degrees of movement of part 68b is provided for.

This construction may be applied to a retractable instrument, movement of the rear part 68b to the folded position serving the procure retraction of the writing unit 11 to a position in which the writing extremity 14 and the ball 15 are buried in a groove 17b in the forward end of the holder and movement of the part 68b to the aligned operative position propelling the unit 11 to a position in which the writing extremity 14 and ball 15 are exposed for writing but with the tubular member 13 being still received in the groove 17b for approximately half its diameter and thereby positioned. For this purpose, the groove 17b in the forward end of the holder is made deeper than the corresponding groove 17a in the embodiment of FIG. 1. To provide a retracting force, a plug member 73 is tightly fitted into the end of the reservoir tube 12 and is provided with a lateral extension 73a slidably received in a bore 74 in the part 68a which contains a compression spring 75 pressing against extension 73a so as to urge the unit 11 towards the retracted position. In the folded position of the part 68b, the spring 75, therefore, retracts the unit 11 as shown in FIG. 27. When the part 68b is moved to the extended position, a nose 76 thereon engages the plug 73 and pushes the instrument to the projected writing position against the action of spring 75. The plug 73 may have a rounded extremity to fit in a cup 77 on the nose 76.

The embodiment shown in FIGS. 29 and 30 makes use of a re-entrant groove along the shaft of the instrument to receive the reservoir of the unit and to hold the latter in position, but, instead of this re-entrant groove being formed along the top of the shaft, it is formed at 79a and 79b along the bottom of the shaft, the reservoir tube 80 being bent to conform to the profile of the shaft 81. The latter may be formed with front and rear parts 81a and 81b connected by a spigot 82. The cranking of the reservoir 80 prevents rotation of the reservoir about its longitudinal axis and, because of this cranking, the reservoir is best made from metal tubing. As is apparent from the drawing, the groove 79a extends upwardly to intersect the upper surface of the mounting for the writing extremity so that a portion of the writing extremity lies in a groove which extends rearwardly from the forwardmost extremity of the holder along its upper surface.

FIG. 31 shows an instrument which is intended to be thrown away when emtpy, for which purpose instead of the holder being equipped with a replaceable writing unit, the reservoir is constituted by a hole 86 extending lengthwise of the holder shaft 84. The reservoir 86 communicates with a tubular member 93, the rear 93a of which is plugged into a diagonal hole 88 in the shaft 84 and which has a straight central portion 93b and an inclined end portion 93c lying in a groove 89 in the top surface of the forward part of the shaft. Both of the portions 93b and 93c and, if desired, the portion 93a also may be fixed in position by a suitable adhesive such as an epoxy resin.

In the embodiment of FIG. 32, which is also intended to be thrown away when empty, the reservoir is a longitudinal hole 87 offset towards the top of the shaft 85 rather than being centrally located. In addition, the writing extremity comprises a tubular member 13 which is inserted in the forward end of the hole and a socket 14 carrying a ball 15, the tubular member having a single bend as in FIG. 1. The holder shaft 85 may be curved or bent upwardly and, to accomplish this, the shaft may be molded in this form or it may be molded in the substantially straight form shown in outline by dotted lines 85' and subsequently bent about the point of grip, i.e., about 1 to 1½ inches from the writing extremity. The object of bending the shaft about the point of grip is to obtain a greater positive trail by a displacement of the effective axis of the instrument, as shown by the chain-dotted line 16a.

In the embodiment of the invention shown in FIGS. 33–37, the writing unit 100 for the writing instrument comprises a tubular ink cartridge 101 to which a writing extremity is affixed at the forward end of the writing extremity, including a tubular member 102 which is bent in the manner described above with respect to FIG. 9.

The holder for this instrument is composed of a hollow shaft portion 103 and a mounting portion 104 which extends rearwardly into and is frictionally received in the bore of the hollow shaft portion. The cross-sectional profile of the shaft 103 is circular throughout its length, the outside diameter at the forward end being about 0.320 inch to 0.360 inch, increasing in the region A to a maximum diameter of about 0.400 inch to about 0.440 inch which continues over the region designated B and then tapering off toward the rear and ending in a rounded tip.

Within the mounting 104, the writing unit is received in a groove 105 which extends parallel to the axis of the instrument but is laterally spaced therefrom by a distance $h$. The grove 105 is re-entrant along its forward portion so as to expose the writing extremity while retaining it in the mounting and it is totally enclosed rearwardly in the region where the mounting 104 enters the shaft 103. In a representative embodiment of the invention, the distance $h$ was about 0.100 inch. Consequently, the ratio of this dimension to the radius of the shaft in the region A where the index finger rests in use, called the eccentricity, is about 0.5 to 0.6. Moreover, inasmuch as the writing ball is disposed about $\frac{1}{16}$ inch above the instrument axis in the pen of FIG. 33, when the pen is held at a flat writing angle of about 30 degrees, the amount of positive trail is approximately $\frac{1}{8}$ inch, as indicated by the dimension N in FIG. 33, the writing surface being designated therein by the character S.

In adition, it can be seen from FIG. 33 that the spacing between the point of support of the index finger on the holder and the axis of support of the instrument, i.e., a line joining the writing ball with the portion of the rear end of the shaft which rests in the hand of the writer, is only about 0.120 inch to 0.140 inch in contrast to much larger spacings for pens in which the ball is disposed at or below the instrument axis or the holder is of larger diameter in the region gripped by the fingers.

It has been found that as this spacing is reduced, particularly in proportion to the radius of curvature of the upper surface of the holder, the stability of the instrument in the hand of the writer will be increased. The reason for this is that, because the writing unit and the writing extremity are eccentric to the axis of the holder, the pressure of the finger on the upper surface of the shaft produces a turning moment about the axis of support of the instrument which continuously, automatically, and without visual control, tends to retain the writing instrument in the correct writing position. It will be noted that this turning moment depends not only on the positive trail condition and the eccentricity of the writing unit in the mounting but also on the construction of the rear portion of the holder which rests against the hand. With a symmetric holder shaft, therefore, the tapering of the shaft toward the rear end, as shown in FIG. 33, is very desirable. Furthermore, the relatively large values of eccentricity obtained with the arrangement shown in FIG. 33 disposes the axis of support of the instrument above the center of gravity so that even without finger pressure on the upper surface of the shaft, the instrument tends under the influence of gravity to retain or automatically regain its stable position of equilibrium.

In order to achieve large values of eccentricity, the mounting for the writing extremity is formed, as shown in FIGS. 34–37, with a generally conical forward end portion 104, having a cone angle $d$ of about 25 degrees and an axis inclined upwardly at an angle $e$ of about 9 degrees from the instrument axis, so that the angle $w$ between the bottom of the cone and a line parallel to the axis of the instrument is about 21 degrees. In addition, the front end of the mounting is cut back from the forwardmost extremity in a plane extending at an angle $b$ of about 30 degrees from the plane perpendicular to the instrument axis. Along the upper surface, the conical forward end 106 is cut away, as indicated by the depressed beveled surface 107, to expose the writing extremity and the adjacent portion of the ink reservoir 101 in the re-entrant portion of the groove 105. To the rear of the conical forward end, the mounting 104 is provided with a truncated conical surface cut at an angle $c$ of about 28 degrees to form an annular bead against which the tip of the index finger bears in use, as shown in FIG. 33. The total length $f$ of the mounting is about 0.670 inch, while the length $g$ of the bead is about 0.100 inch.

Rearwardly from the bead formed by the surface 108 is a cylindrical extension 109 which is arranged to be frictionally received within the hollow shaft 103. For this purpose, the extension is made of a slightly elastic synthetic plastic material and is split longitudinally into two side portions 110 and 111 in the upper region, as best seen in FIG. 35. The portions 110 and 111 are partially joined at the bottom by a triangular web 112, having an angle $a$ of about 15 degrees, as best seen in FIG. 34, but the bottom of the cylindrical extension is open for a distance $m$ of about 0.300 inch at the rear end. In order to retain the writing unit 100 in the proper orientation in the writing instrument, the ink cartridge 101 has a short section 113 which is flattened in a lateral direction. In assembly, the flattened section 113 is positioned between two jaws 114 and 115 at the upper ends of the two side portions 110 and 111, respectively, so as to be securely held in the proper orientation by the jaws when the cylindrical extension 109 is pressed into the slightly smaller hollow shaft 103.

To assemble the writing instrument, the writing unit 100 is inserted into the groove 105 from the rear of the mounting 104, the jaws 114 and 115 being sufficiently flexible to permit the full diameter of the cartridge to pass between them. When the writing extremity is oriented properly and the flattened portion 113 is disposed between the jaws 114 and 115, the mounting is pressed into the holder shaft 103 in which it is frictionally retained. Inasmuch as the jaws 114 and 115 cannot be expanded while the cylindrical extension 109 is thus confined within the shaft 103, the writing unit 100 is securely held in the proper orientation.

In the modification shown in FIGS. 38 and 39, a writing instrument having a retractable writing unit 100a is provided. For this instrument, the mounting 104 is the same as that just described and the writing unit 100a is the same as the unit 100 except that it has a longer flattened portion 113a to permit sliding of the unit between the projected position and a retracted position while maintaining the proper angular orientation. For this purpose, a slide 118 is mounted for longitudinal motion in a holder groove 119 aligned with the rear end of the writing unit 100a. A plug 120, formed at the forward end of the slide 118, fits tightly into the open rear end of the ink cartridge while leaving room for passage of air so that the writing unit 100a can be projected or retracted by motion of the slide in the groove 119. As in the other embodiments of the invention having an ink reservoir enclosed within the holder, a vent is provided in the shaft 103a of the holder.

To provide this motion, the slide is formed on its upper surface with a series of teeth 121 having the shape of segments of thread and these teeth engage an internal thread 122 in a rotatable sleeve 123 which surrounds the slide and a portion of the shaft 103a. In order to permit mounting of the sleeve 123 on the shaft, while preventing longitudinal motion thereof, the rounded rear end 124 of the shaft is removably attached to the shaft body by a threaded plug 124a.

In operation, the writing unit 100a is retracted from the illustrated position by rotating the sleeve 123 in the proper direction with respect to the shaft. When the slide 118 is moved rearwardly a distance designated $z$, which may be ¼ inch, for example, the slide 118 abuts the end of the groove 119. At the same time, the writing extremity is retracted a corresponding distance into the groove 105 along the top of the mounting, thereby preventing contact of the writing ball with other objects. To project the writing extremity to the operating position, the sleeve 123 is turned in the opposite direction until the rear of the flattened portion 113a abuts the jaws 114 and 115.

In the embodiment of the invention shown in FIG. 40, a writing instrument comprises a writing unit 125 mounted for selective projection and retraction in a holder 126 which is made of a hollow shaft portion 127 and a forward mounting portion 128 having a rearwardly projecting cylindrical extension 129 which is frictionally received within the bore 130 of the holder shaft 127. The writing unit 125 includes an ink cartridge 131 of larger than capillary dimensions axially disposed for longitudinal sliding motion within the bore 130 and a writing extremity 132, including a tubular member which is bent in accordance with the copending Fehling et al. application Ser. No. 284,175, filed May 29, 1963, now Patent 3,281,-933 as described above with respect to FIG. 9 of this application. In addition, the writing unit 125 is provided with a keying arrangement, as also disclosed in that application, to assure proper orientation of the bent writing extremity in the holder and, in the embodiment of FIG. 40, the keying arrangement consists of a cranked central portion 133 in an adapter tube 134 which connects the writing extremity 132 to the ink cartridge 131.

As best seen in FIG. 41, the axes of the two ends 135 and 136 of the adapter 134 are parallel and are displaced laterally by a distance selected to provide the proper eccentricity of the writing extremity, as described above with respect to FIGS. 33-37. The two bends connecting the cranked portion 133 with the ends 135 and 136 are preferably produced by relative lateral displacement of two blocks 137 and 138 having bores 139 and 140 in which the two ends 135 and 136 of the adapter are received, respectively, as shown in in FIG. 42. For convenience, this double bend in the adapter should be made before the operation of tilting the writing extremity 132 is completed, since the method of tilting described in the above-mentioned Fehling et al. application Ser. No. 284,175 is readily adaptable to orienting a keying member with respect to the bend in the writing extremity, as also described therein. Preferably, the tilting of the writing extremity and the cranking of the adapter are accomplished in the same setting operation to assure proper alignment.

The mounting 128 has a forward end shaped in the same manner as the mounting 104 of FIGS. 33-37, including an upwardly inclined conical end and an annular bead. The cylindrical extension 129, however, has a bore 141 centered slightly below the instrument axis in which a spring 142 is received. This spring is compressed between the inner end of the bore 141 and the abutment formed by the forwardly facing side of the cranked adapter portion 133, so as to urge the writing unit 125 rearwardly, and a conventional projecting and retracting mechanism (not shown) within the rear end of the holder shaft 127 is operable by a button 143 at the rear of the shaft in the usual manner to selectively project and retract the writing extremity 132 with respect to the mounting 128.

Although proper orientation of the writing unit 132 is assured by the eccentric disposition of the forward adapter portion 135 with respect to the axial bore 130 in which the cartridge 131 is slidable, accurate orientation is also obtained by providing a pair of opposed jaws 144 at the rear end of the cylindrical extension 129. These jaws (only one of which is visible in FIG. 40) are similar to the jaws 114 and 115 of FIGS. 34 and 35 and they embrace the cranked adapter portion 133 and thereby eliminate any tendency of the writing extremity to turn one way or the other, which might occur if the cartridge 131 is not a close fit in the bore 130. At the same time, the cranked portion 133 is permitted to slide longitudinally between the jaws during the projecting and retracting operations. In an alternative embodiment (not shown) in which a capillary ink cartridge, substituted for the adapter 134 and the large diameter cartridge 131, is bent in the manner shown in FIG. 42 to provide the cranked section 133 as a keying arrangement, the opposed jaws 144 are especially effective to maintain proper orientation of the writing unit.

Furthermore, in writing units of the type shown in FIGS. 40 and 41 wherein the adapter 134 having the cranked portion 133 is separate from the ink cartridge 131, the forwardly facing abutment formed by the cranked portion has a further advantage additional to providing an abutment for the spring 142. Any assembly of a writing extremity with a reservoir requires the application of an axial force on the part including the writing extremity. If the latter is tilted, the application of such a force on the tilted forward end of the nib is likely to deform the ball housing which must be avoided. This can be done by using the cranked part as an abutment for applying or resisting such a force.

If the mounting 104 of the embodiment shown in FIGS. 33-39 and the mounting 128 of FIG. 40 are made of a slightly resilient plastic material, the writing extremity and the exposed part of the writing unit may bend upwardly a small amount under the force of writing thereby imparting a very desirable flexibility to the forward end of the writing unit. Moreover, this flexibility may be enhanced, if desired, by making the open part of the groove in the mounting nonre-entrant (i.e., semi-circular in cross-section) as in the other embodiments of the invention, so that the mounting will not impede the upward movement of the forward end of the writing unit.

The flexibility of the writing unit in this manner is considerable despite the stiffness of the material of which it is made because the fulcrum of its bending movement is at least as far back as the position of the annular bead 108 (FIG. 35). If desired, the fulcrum of bending movement may be moved even farther back by enlarging the enclosed portion of the groove 105 in the plane of the instrument axis so that, for comparatively small bending amplitudes (under small writing pressure), the free end of the writing unit which may be as long as 1 inch acts like a very soft spring. Excessive upward movement of the writing extremity under high writing pressures, which might permanently deform the writing unit, is automatically prevented by engagement of the writing unit with the upper surface of the groove 105 within the bead 108, thus shortening the free length of the writing unit. This also has the desirable effect of converting the soft spring into a hard one for writing under strong pressure as required, for example, to produce numerous carbon copies.

Although the invention has been described herein with respect to various specific embodiments, many modifications and variations therein will readily occur to those skilled in the art. Accordingly, all such variations and modifications are included within the intended scope of the invention as defined by the following claims.

We claim:

1. In a ball point writing instrument including a holder, a reservoir of writing fluid within the holder and a writing extremity eccentrically disposed at the forward end of the holder, a tubular member having a cranked portion, a forward portion extending parallel to the axis of the holder in eccentric relation thereto and communicating with the writing extremity to supply writing fluid thereto, and a rearward portion extending axially within the holder to communicate with the reservoir of writing fluid, the forward and rearward portions being joined by the cranked portion, and including spring means within the holder engaging the cranked portion of the tubular member to urge it in one direction, and means within the holder for selectively moving the writing extremity to projected and retracted positions.

2. In a writing instrument having a holder formed about a central longitudinal axis with a longitudinally extending opening therein and an aperture at the forward end of the holder, a writing unit including a ball point writing tip at its forward end slidably disposed in said longitudinal opening for shifting between projected and retracted positions with respect to said forward holder end, means normally biasing said writing unit toward retracted position and means for selectively positioning said writing unit at projected and retracted positions, the improvement of said ball point writing tip having a conical portion the axis of which is inclined toward the central longitudinal axis of said holder, said conical portion terminating in a ball retaining tip which lies in a plane facing the longitudinal axis of said holder and adapted for disposition in said forward holder aperture so that said conical portion of the writing tip when projected is frontally disposed of and inclined toward said central longitudinal axis of said holder to afford a visible writing tip having a near vertical writing angle when brought in contact with a writing surface and to provide a balanced writing instrument that precludes any tendency to rotate about said central longitudinal axis of said holder when held by the writer in normal writing position, wherein said holder extends forwardly toward a location near said writing tip adjacent to said holder axis and is at least partially cut away rearwardly therefrom on the side visible to the writer in normal writing position to expose at least a portion of said writing unit adjacent to said writing tip to improve the visibility thereof to the writer.

3. In a ball point writing instrument having a writing extremity at its forward end including a writing ball, a ball-receiving socket, and a tubular member to supply writing fluid to the socket and a mounting for the writing extremity forming the forward end of the instrument having a generally tapered exterior surface, the writing extremity projecting forwardly from the forward end of the instrument, the tubular member extending rearwardly along the generally tapered exterior surface of the mounting for a distance at least equal to the forward projection of the writing extremity beyond the forward end of the instrument, the combination therewith of a shaft extending rearwardly from the mounting and being separable from the mounting, the shaft being formed with a longitudinal bore, and a reservoir of writing fluid receivable in the bore in the rear portion and communicating with the tubular member in the front portion.

4. A ball point writing instrument according to claim 3 wherein the tubular member is bent at a location closely adjacent to the socket so that the socket axis is inclined with respect to the axis of the writing instrument, a holder including the mounting for the writing extremity at the forward end of the instrument, the shaft extending rearwardly from the mounting and adapted to be held in the hand of the user, and a bead-like projection at the forward end of the shaft to provide a forward abutment which limits the position of the fingers in the forward direction when the writing instrument is held in the normal writing position.

5. A ball point writing instrument comprising
(a) an elongate holder including
 (i) a mounting for a writing extremity at the forward end of the holder having an external groove extending rearwardly from the forwardmost extremity of the holder along the upper surface of the holder when held in the normal writing position to receive a writing extremity in a position visible to a writer in use,
 (ii) the mounting having an exterior surface which generally converges toward the forwardmost extremity of the instrument to provide a profile to the writer formed by lines which converge toward an apex at the location of the writing ball of a writing extremity received in the mounting, thereby facilitating accurate control of the trace during writing, and
 (iii) a shaft extending rearwardly from the mounting and adapted to be held in the hand of a writer,
(b) a writing extremity received in the mounting including
 (i) a ball-receiving socket having a writing ball mounted therein and having a feed duct coaxial with the socket to supply ink to the rear of the writing ball,
 (ii) a tubular member extending rearwardly from the socket having an internal passageway to supply ink to the feed duct and being bent at a location closely adjacent to the socket so that the socket axis is inclined with respect to the axis of the writing instrument so as to be more nearly perpendicular to a writing surface than the axis of the writing instrument when the instrument is held in the normal writing position,
 (iii) a portion of the tubular member to the rear of the bend therein being received in the external groove along the upper surface of the mounting so as to be visible to the writer in the normal writing position, thereby further facilitating accurate control of the trace during writing,
 (iv) the external groove along the upper surface being displaced sufficiently from the axis of the instrument and the bent portion of the tubular member being sufficiently short that the writing ball of the writing extremity is disposed above the axis of the writing instrument, whereby the instrument is stably supported in the hand of the writer in use, and
(c) a reservoir of writing fluid, including a passageway having a cross-sectional area larger than that of the passageway within the bent portion of the tubular member, communicating with the tubular member to supply ink to the writing ball therethrough and extending rearwardly from the tubular member into the shaft portion of the holder.

6. A ball point writing instrument according to claim 5 wherein the external groove continues longitudinally along the upper surface of the mounting toward the shaft and the tubular member rearwardly of the bend therein is disposed within the groove substantially parallel to the axis of the writing instrument and is laterally spaced from the instrument axis by a distance equal to about 50 to 60 percent of the radius of the shaft in the region gripped by the fingers in the normal writing position.

7. A ball point writing instrument according to claim 1 wherein the holder comprises separable front and rear portions, the rear portion comprising a hollow shaft having an outer surface symmetrical with its axis and a cylindrical internal bore, the reservoir of writing fluid comprises a tubular cartridge attached to the writing extremity to form a writing unit which is separable from the holder, and including means forming a key on the tubular cartridge, and a cylindrical rearward extension of the front holder portion adapted to be received in the cylindrical bore of the rear portion and having a shape adapted to cooperate with the key formed on the cartridge to retain the writing unit in the desired orientation in the holder.

8. A ball point writing instrument according to claim 7 wherein the cylindrical rearward extension of the front holder portion is made of slightly resilient plastic material and is longitudinally split and includes a pair of opposed jaws to cooperate with the key formed on the cartridge, and the cartridge key comprises a flattened tube portion disposed between the jaws.

References Cited

UNITED STATES PATENTS

| | | | |
|---|---|---|---|
| 1,459,517 | 6/1923 | Sawyer | 120—102 |
| 1,514,519 | 11/1924 | Harris | 120—42.4 |
| 2,173,451 | 9/1939 | Lorber | 120—103 |
| 2,487,340 | 11/1949 | Kleinsmith | 120—42.4 |

(Other references on following page)

| | UNITED STATES PATENTS | | |
|---|---|---|---|
| 2,603,187 | 7/1952 | Goos | 120—42.13 |
| 2,608,953 | 9/1952 | Kolisman | 120—42.4 |
| 2,879,586 | 3/1959 | Fehling | 29—441 |
| 3,000,090 | 9/1961 | Fehling | 29—441 |
| 3,032,012 | 5/1962 | Lovejoy | 120—42.4 |
| 3,079,895 | 3/1963 | Gordon | 120—42.12 |

| | FOREIGN PATENTS | |
|---|---|---|
| 950,038 | 9/1949 | France. |
| 1,032,122 | 3/1953 | France. |
| 902,352 | 1/1954 | Germany. |
| 496,361 | 7/1954 | Italy. |

LAWRENCE CHARLES, *Primary Examiner.*